(12) United States Patent
Hirschmann et al.

(10) Patent No.: US 10,794,417 B2
(45) Date of Patent: Oct. 6, 2020

(54) SELF-PUNCHING PRESS-FIT ELEMENT, PRESS-FIT CONNECTION, AND METHOD FOR PRODUCING SUCH A PRESS-FIT CONNECTION

(71) Applicant: RICHARD BERGNER VERBINDUNGSTECHNIK GMBH & CO. KG, Schwabach (DE)

(72) Inventors: Markus Hirschmann, Erlangen (DE); Juliane Niedermueller, Buechenbach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 39 days.

(21) Appl. No.: 16/131,274

(22) Filed: Sep. 14, 2018

(65) Prior Publication Data

US 2019/0010973 A1   Jan. 10, 2019

Related U.S. Application Data

(63) Continuation of application No. PCT/EP2017/056028, filed on Mar. 14, 2017.

(30) Foreign Application Priority Data

Mar. 14, 2016 (DE) .................. 10 2016 204 173

(51) Int. Cl.
*F16B 37/06* (2006.01)

(52) U.S. Cl.
CPC ............ *F16B 37/068* (2013.01); *F16B 37/06* (2013.01)

(58) Field of Classification Search
CPC ...... F16B 37/06; F16B 37/065; F16B 37/068; Y10T 29/4992; Y10S 411/967
(Continued)

(56) References Cited

U.S. PATENT DOCUMENTS 3,000,420 A   9/1961 Spokes
3,213,914 A * 10/1965 Baumle ................. B23P 19/062
                                                        411/179
(Continued)

FOREIGN PATENT DOCUMENTS

CN   104329345 A   2/2015
DE   102005056577 A1   5/2007
(Continued)

*Primary Examiner* — Roberta S Delisle
(74) *Attorney, Agent, or Firm* — Laurence A. Greenberg; Werner H. Stemer; Ralph E. Locher

(57) ABSTRACT

A self-punching press-fit element, in particular a punching nut, has a head part with a head bearing for bearing on a component, as well as a punching collar having an end-side cutting edge. An undercut is configured between the punching collar and the head bearing. An encircling displacement web is configured so as to adjoin the punching collar on the head bearing, the encircling displacement web being adjoined in the radial direction by a further external region of the head bearing. The further external region in the longitudinal direction is set back in relation to the displacement web. During the configuration of the press-fit connection, material is press-fitted from the upper side of the component into the undercut by the displacement web. A deformation of the lower side of the component is preferably not performed.

18 Claims, 3 Drawing Sheets

(58) Field of Classification Search
USPC ................ 411/175–177, 179, 180, 181, 183
See application file for complete search history.

(56) References Cited

U.S. PATENT DOCUMENTS

| | | | |
|---|---|---|---|
| 5,302,066 A | 4/1994 | Bieschke et al. | |
| 5,531,552 A * | 7/1996 | Takahashi | B21K 1/702 29/432.2 |
| 5,549,430 A * | 8/1996 | Takahashi | B21K 1/702 29/432.2 |
| 6,220,804 B1 * | 4/2001 | Pamer | F16B 37/068 29/432.2 |
| 6,644,903 B1 | 11/2003 | Arand | |
| 6,851,904 B2 * | 2/2005 | Parker | B21K 1/702 411/180 |
| 6,866,456 B2 * | 3/2005 | Bentrim | F16B 37/065 411/353 |
| 7,001,125 B2 * | 2/2006 | Wojciechowski | F16B 33/004 411/180 |
| 7,066,700 B2 * | 6/2006 | Ward | B21K 1/702 411/180 |
| 7,112,024 B2 * | 9/2006 | Ward | F01N 13/009 411/180 |
| 8,021,091 B2 * | 9/2011 | Bentrim | F16B 37/068 411/180 |
| 8,142,125 B2 * | 3/2012 | Vrana | F16B 37/062 411/181 |
| 8,371,785 B2 * | 2/2013 | Babej | F16B 37/062 411/180 |
| 2008/0206013 A1 | 8/2008 | Bentrim | |
| 2010/0129174 A1 | 5/2010 | Maloney | |
| 2014/0173877 A1 | 6/2014 | Chiu | |
| 2014/0314525 A1 | 10/2014 | Ku et al. | |

FOREIGN PATENT DOCUMENTS

| | | |
|---|---|---|
| DE | 102014104571 A1 | 10/2015 |
| EP | 2604871 A2 | 6/2013 |
| GB | 1468150 A | 3/1977 |
| JP | H10394412 U | 9/1991 |
| WO | 2015154755 A1 | 10/2015 |

\* cited by examiner

SELF-PUNCHING PRESS-FIT ELEMENT, PRESS-FIT CONNECTION, AND METHOD FOR PRODUCING SUCH A PRESS-FIT CONNECTION

CROSS-REFERENCE TO RELATED APPLICATION

This is a continuation application, under 35 U.S.C. § 120, of copending international application No. PCT/EP2017/056028, filed Mar. 14, 2017, which designated the United States; this application also claims the priority, under 35 U.S.C. § 119, of German patent application No. DE 10 2016 204 173.8, filed Mar. 14, 2016; the prior applications are herewith incorporated by reference in their entireties.

BACKGROUND OF THE INVENTION

Field of the Invention

The invention relates to a self-punching press-fit element such as, for example, a punching nut, which is configured for self-punching press-fitting into a component, in particular a sheet metal. The invention furthermore relates to a press-fit connection between a self-punching press-fit element of this type and a component, as well as to a method for configuring said press-fit connection.

A punching nut having the features of the preamble of patent the main claim can be derived, for example, from published, non-prosecuted German patent application DE 10 2014 104 571 A1.

Self-punching press-fit elements generally have a punching collar having an encircling end-side cutting edge. For configuring the joining or press-fit connection, the press-fit element, with the punching collar leading, is pressed against an upper side of the metal. A suitably configured die is positioned as a counter bearing on the opposite side. A hole into which the punching collar is introduced is punched into the component by the punching collar. By way of further deformation procedures in this single-step punching and press-fitting procedure, both an axial extraction safeguard and an anti-rotation safeguard of the press-fit element are then usually configured.

In order for the anti-rotation safeguard to be configured, the known punching nuts on a lower side of the head of the punching nuts have radially extending ribs. The ribs are usually disposed in a trough-type annular depression which toward the inside is delimited by the punching collar and toward the outside is delimited by a further encircling annular collar.

According to published, non-prosecuted German patent application DE 10 2014 104 571 A1, the metal sheet in the press-fitting procedure is press-fitted from below into the intermediate spaces between the individual anti-rotation safeguard cams with the aid of an encircling annular cam of the die. An axial extraction safeguard is simultaneously also established on account of this displacement of material.

According to DE 10 2014 104 571 A1, radially projecting cams are additionally configured on a shell side of the punching collar for additional anti-rotation safeguard.

A similar design embodiment of a punching nut can also be derived from U.S. design patent D437 211 S. A further punching nut in which the punching collar is provided with an encircling knurling can be derived from published, non-prosecuted German patent application DE 10 2009 012 243 A1.

A punching nut having a knurling on the punching collar can likewise be derived from British patent GB 1 468 150 B. A head bearing face is configured so as to slope inward in a conical manner such that the sheet material at the rim of the hole invades an approximately V-shaped undercut between the punching collar and the head bearing face.

Self-punching press-fit elements of this type, in particular punching nuts, are used in particular also in the automotive industry, especially in light-weight construction applications for components from light metal. Press-fit elements of as small a construction as possible are targeted for reasons of weight saving and of a small installation space. However, this often runs counter to the requirements with a view to a sufficient axial extraction strength and a sufficient anti-rotation protection.

SUMMARY OF THE INVENTION

Proceeding therefrom, the invention is based on the object of specifying a self-punching press-fit element, in particular punching nut, by way of which a reliable press-fit connection with a (sheet) component can be configured. The invention is furthermore based on the object of specifying a corresponding press-fit connection and a method for configuring the latter.

The object is achieved according to the invention by a self-punching press-fit element, in particular a punching nut, having the features of the first main claim. The object is furthermore achieved by a press-fit connection between a press-fit element of this type and a component, having the features of the second main claim, as well as by a method for configuring a press-fit connection of this type, having the features of the main method claim.

The advantages and preferred design embodiments set forth with regard to the press-fit element can also be applied in analogous manner to the press-fit connection as well as to the method and vice versa.

The press-fit element herein generally extends in a longitudinal direction and has a head part having a lower side that is configured as a head bearing by way of which the head part in the compressed state bears on an upper side of the component. The press-fit element furthermore has a punching collar that is configured on the lower side of the head part, said punching collar having an end-side encircling cutting edge. The punching collar herein has an external shell face which in relation to the longitudinal direction is obliquely inclined and said punching collar in particular is preferably configured overall so as to widen in a conical manner. On account thereof, a void or undercut is configured between the cutting edge and the head bearing. It is furthermore of particular relevance that the head bearing has an encircling displacement web which is adjoined in the radial direction by a radially external region of the head bearing, wherein the radially external region in the longitudinal direction is set back in relation to the displacement web. The displacement web herein is in particular configured as a completely encircling annular web. The displacement web herein in particular directly adjoins the punching collar in the radial direction, thus forming an encircling bead to the punching collar.

The particular advantage of this displacement web that is configured on the head bearing and directly adjoins the punching collar is that in the press-fit procedure, with the aid of said displacement web, material is displaced in a forming procedure and thus press-fitted from the upper side of the component into the undercut or void, respectively. This material from the upper side of the component that is press-fitted into the undercut therefore, conjointly with the punching collar, forms a form fit that is effective in the axial or longitudinal direction for a reliable axial extraction safeguard. The encircling displacement web is therefore configured overall in such a manner that when press-fitting sheet material is displaced into the undercut in order for the axial extraction safeguard to be configured. On account of the displacement as well as of the press-fitting of the material, jamming and thus a force fit are moreover already also achieved such that the press-fit element already by virtue of the jamming is also secured against rotation. This occurs both by way of the friction of the displacement web that acts in the circumferential direction and by way of the friction between the press-fitted material and the external shell face of the punching collar. Therefore, the displacement web in the press-fitted state generates an additional advantageous friction. The displacement web per se preferably does not have any form-fitting elements that act in the circumferential direction such as, for example, a knurling on the shell side for an anti-rotation safeguard function.

In order for the axial extraction safeguard to be configured, in particular no reshaping of the lower side of the sheet material is therefore required, nor is this provided. This enables in particular a smooth component lower side even in the case of a press-fitted punching element. Moreover, no reshaping of the punching collar is required either, for example in order for the desired form fit in the axial direction to be configured, for example by configuring a quasi-tongue-and-groove engagement with the component lower side. In this case, the punching collar would project below the side of the component which is likewise often undesirable.

The displacement web herein, transitions into the radially external region configuring a step. Therefore, in particular an encircling displacement edge is configured. The displacement web, when viewed in cross section, preferably has an annular horizontal face and a shell face that adjoins the annular horizontal face and preferably runs so as to be parallel with the longitudinal direction. In principle, the shell face can also be oriented so as to be inclined in relation to the longitudinal direction.

In order for the required anti-rotation safeguard to be configured, a plurality of ribs are furthermore configured so as to be distributed around the circumference in the radially external region. The plurality of ribs herein run in the radial direction. The lateral faces of said ribs that are oriented in the circumferential direction therefore form, in the press-fitted state, a form fit with the component that is effective in the circumferential direction. The ribs are press-fitted into the upper side of the component in the press-fitting procedure.

Preferably more than 8 ribs, in particular 10 ribs, are disposed herein, and are preferably disposed so as to be distributed in a uniform manner around the circumference. A maximum of 14 ribs are configured, for example. Each rib has a rib width, and the spacing between neighboring ribs, in contrast to a knurling, is significantly larger than the rib width and, for example, is at least 2 times or at least 3 times the rib width.

The head bearing, in particular the radially external region of the head bearing, herein is expediently aligned so as to be perpendicular to the longitudinal direction, thus horizontally aligned, and thus preferably does not have a head bearing face that is inclined in relation to the longitudinal direction. The head bearing overall is configured as a planar annular face having the ribs as elevations.

Ribs for configuring the anti-rotation safeguard are expediently disposed exclusively in this radially external region of the head bearing. Neither the displacement web nor the punching collar in a preferred design embodiment therefore has further ribs or the like that are configured as anti-rotation safeguard elements. The ribs in the radial direction herein extend across almost the entire external region, at least across at least ¾ of the external region. The ribs typically taper off in an oblique or rounded manner toward a circumferential periphery of the press-fit element.

The ribs in the radial direction directly adjoin the displacement web and in the radial direction are preferably aligned with the displacement web. The ribs in the radial direction therefore transition into the displacement web without a shoulder, and are therefore disposed at the same axial height.

On account of the ribs that adjoin directly in particular so as to be aligned, material is additionally pressed in the direction of the undercut such that a high filling ratio is achieved.

The encircling shell face of the displacement web and/or of the punching collar are/is preferably configured as smooth shell faces, specifically in particular as conical and/or cylindrical shell faces. The punching collar especially has a conical shell face, and the displacement web especially has a cylindrical shell face. Therefore, with the optional exception of the ribs, no form-fitting elements, such as, for example, a knurling, that act in the circumferential direction are configured on the displacement web.

Furthermore, the head part on the lower side thereof does not have an external encircling annular web. The ribs taper off freely toward the outside without said ribs being delimited by an external encircling annular web. In the case of conventional punching nuts in which the metal sheet in the press-fitting procedure is pressed from below against the head bearing and is molded into the latter, the external encircling annular web is usually provided additionally in order for the axial extraction safeguard to be configured. The external encircling annular web in the case of the conventional punching nuts typically also has an undercut. On account of the present measure with the displacement web which press-fits material from above into the undercut on the punching collar, this annular web can be advantageously dispensed with. The axial extraction safeguard is configured exclusively by press-fitting material into the undercut on the punching collar.

The press-fit connection that is produced by way of a press-fit element of this type is therefore distinguished overall in that specifically no forming of the lower side of the component is performed.

In order for sufficient material to be able to be press-fitted into the undercut, the displacement web in the radial direction projects beyond the cutting edge, that is to say that the displacement web extends up to a radius which is larger than the radius that is defined by the cutting edge.

The displacement web, in particular that part-region that in the radial direction projects beyond the cutting edge, defines a first (displacement) volume, and the undercut defines a second volume. In order for a complete filling of the undercut with material that is displaced by the displacement web to be reliably guaranteed, the first volume in a preferred design embodiment is larger than the second volume. In particular, the first volume is larger than the second volume by a factor from 2 to 5, especially from 3 to 4.

A complete filling of the undercut and the desired jamming are reliably achieved on account of the significantly larger displacement volume. Complete filling herein is to be understood to mean that the material that is displaced into the undercut fills the undercut, optionally with the exception of a minor void in the transition region of the punching collar to the displacement web. The degree of filling of the undercut is at least 90%.

The ribs in total altogether preferably have a third volume which is smaller than the first volume of the displacement web (16), in particular is merely 30% to 90% of the first volume.

The displacement web furthermore has a radial width which is smaller than or equal to a radial width of the external region of the head bearing. The radial width of the displacement web is, for example, at least 0.5 times the radial width of the external region, and in particular is in the range between 0.5 times and 0.9 times the external region. A radial width herein is generally understood to be the width of the respective (annular) face of the displacement web, on the one hand, and of the external region in the radial direction, on the other hand. On account of this measure it is ensured that the external region has a sufficiently large radial width, which is required for the desired anti-rotation safeguard and for the ribs. The displacement web at the same time is sufficiently large in order to be able to displace the desired quantity of material for the axial extraction safeguard into the undercut.

The displacement web moreover has an axial length which is preferably smaller than an axial length of the punching collar and in particular is in the range between 30% and 70%, and preferably in the range between 40% and 60%, of the axial length of the punching collar. The axial length herein is preferably approximately half the axial length of the punching collar. The axial length of the displacement web herein is to be understood to mean the extent of the displacement web in the longitudinal direction, starting at the axial height of the external region (at the transition to the displacement web) up to the (horizontal) annular face of the displacement web. The axial length of the punching collar in turn is defined as the extent in the longitudinal direction, starting from the annular face of the displacement web up to the cutting edge.

The press-fit element herein is in particular a punching nut having an internal thread in the head part. The punching collar is preferably offset radially outward in relation to the internal thread, and therefore is not aligned with the thread. Forces that act in the punching procedure therefore in particular do not influence the true-to-gauge properties of the thread. On account of the spacing in the radial direction, i.e. in particular of a step-shaped offset of the punching collar in relation to the internal thread, it is therefore ensured that no undesirable deformation of the internal thread arises.

It is furthermore generally also provided that no internal thread is configured on the punching collar per se. The internal thread furthermore expediently extends up to the axial height of the displacement web. This corresponds to the axial position of the horizontal annular face of the displacement web. The press-fit element in this region is overall comparatively rigidly configured on account of the displacement web. At the same time, the internal thread on account thereof is drawn as far as possible in the direction toward the punching collar such that the axial length of the head part can overall be kept small so as to be able to design in particular the punching nut to be of as compact a construction as possible.

With regard to the desired design embodiment of small construction, a diameter of the head bearing is merely approximately 20% to 40%, and in particular merely approximately 25% to 35%, larger than a diameter of the punching collar. A punching nut of as small a construction as possible overall is guaranteed on account of this measure. On account of the measures described above pertaining to the axial extraction safeguard and to the anti-rotation safeguard, the required extraction and anti-rotation strengths can also be reliably achieved in the case of elements of small construction of this type.

Diameter is in the present case understood to mean in each case generally the maximum spacing in the radial direction between opposite regions of the head bearing or of the punching collar, respectively. Usually, the press-fit element is configured so as to be rotationally symmetrical in relation to a central axis and has a circular cross section. Alternatively, however, there is also the possibility of a cross section of the press-fit element, in particular of the head part of the latter, not being round but, for example, polygonal.

In the case of the press-fit connection that is configured by way of a press-fit element of this type, in particular a punching nut, material is press-fitted, on account of the displacement web, from the upper side of the component into the undercut between the cutting edge and the displacement web, as has already been mentioned.

The press-fit connection is furthermore distinguished in that the punching collar does not project beyond a lower side of the component. The punching collar is preferably aligned with the lower side, or is set back only slightly in relation to said lower side in the longitudinal direction (for example up to 10%, at most up to 20%, of the component thickness).

The press-fit connection is furthermore preferably distinguished in that the component, on the lower side thereof, is specifically not bent upward in the direction toward the head part. Rather, the component, in a manner encircling the punched hole in which the press-fit element is press-fitted, has a planar non-deformed component lower side. The punching collar therefore also does not encompass the component lower side.

The component herein is in particular a light-metal component, that is to say that the component is composed of a light metal, in particular of aluminum. This is understood to generally include aluminum alloys or else pure aluminum. As an alternative to an aluminum component, the component can also be composed of, for example, a magnesium alloy, etc. In particular in the case of light-metal components of this type which are used especially in the automotive industry for reducing weight, punched elements of this type are used as connection elements. The press-fit element per se is usually composed of steel.

In the method for producing such a press-fit connection, first, in a manner known per se, a hole is punched into the component in a single-step procedure with the aid of the self-punching press-fit element, and the press-fit element is subsequently press-fitted into the punched hole. This is performed with the aid of a die which is pressed against the lower side of the component. An item of punching scrap herein is received in the die by way of a clearance and discharged.

It is of particular relevance herein that the die has a planar die upper side and specifically no encircling annular collar which deforms the metal sheet on the lower side thereof and presses the latter upward. On account of this measure the desired flush termination and the planar component lower side are guaranteed.

The internal clearance of the die herein expediently has a roughened internal shell face such that the item of punching scrap is held securely and reliably in the clearance, in particular by way of a force fit. It is prevented on account of this measure that the item of punching scrap continues to adhere to the component or to the press-fit element upon retraction of the die. A high degree of process reliability is achieved on account of this measure. The roughened internal shell face is achieved, for example, by an erosion process. Expediently, merely an upper encircling periphery of the clearance is provided with a roughened feature. Further on, the die then in particular has a smooth internal shell face at the clearance. The internal shell face furthermore expediently widens in a conical manner such that the item of punching scrap, following the roughened region, can be disposed of in a simple manner.

The clearance therefore preferably first has a cylindrical region which has the roughened internal shell face, a region that widens in a conical manner and has a smooth internal shell face subsequently adjoining the roughened internal shell face.

In the case of a subsequent further press-fitting procedure, the item of punching scrap is pushed out by a subsequent item of punching scrap and can be reliably disposed of by way of the clearance.

Other features which are considered as characteristic for the invention are set forth in the appended claims.

Although the invention is illustrated and described herein as embodied in a self-punching press-fit element, a press-fit connection, and a method for producing such a press-fit connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 3 to 5 are sectional views for explaining a punching and joining process for configuring a press-fit connection with a (sheet) component, wherein FIG. 3 shows an initial state prior to the start of the punching and joining process, FIG. 4 shows the situation during the cutting process, and FIG. 5 shows the situation after the joining process, with a configured press-fit connection, in each case in the cross-sectional illustration.

DETAILED DESCRIPTION OF THE INVENTION

In the figures, parts that have the same effect are in each case provided with the same reference signs.

Figure 1:
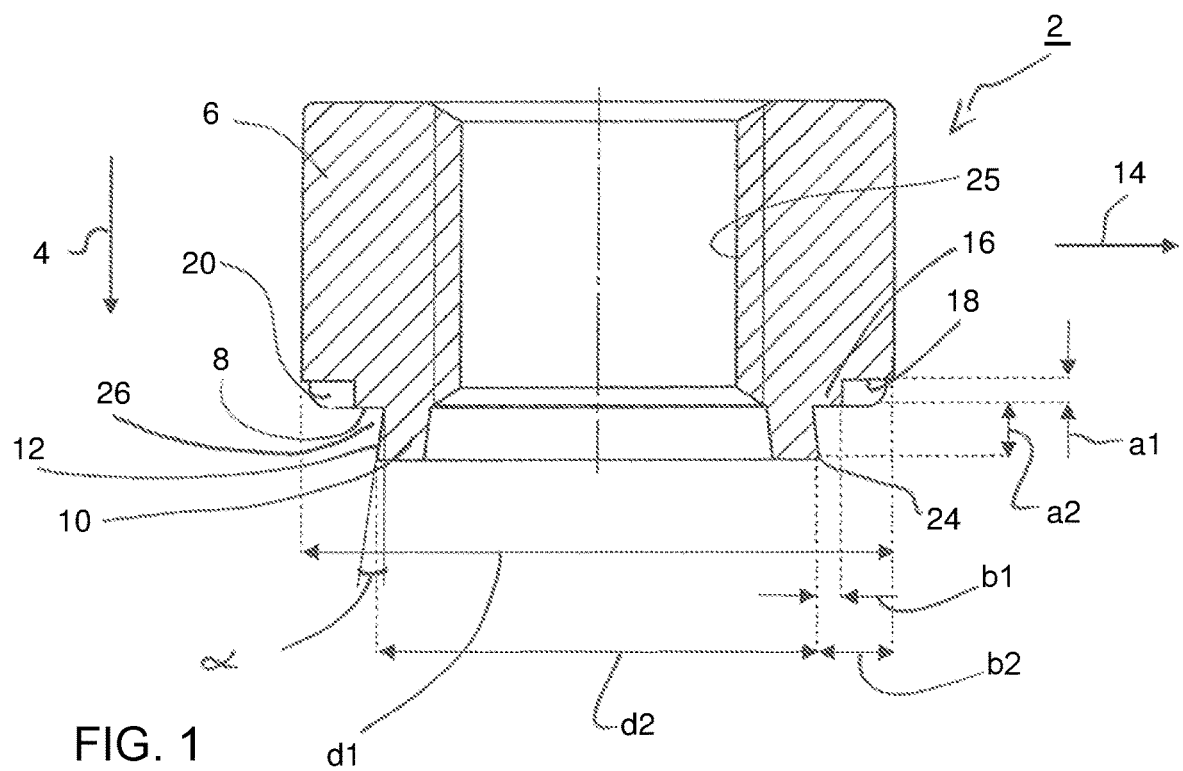
FIG. 1 is a diagrammatic, cross-sectional view of a punching nut according to the invention.
Figure 2:
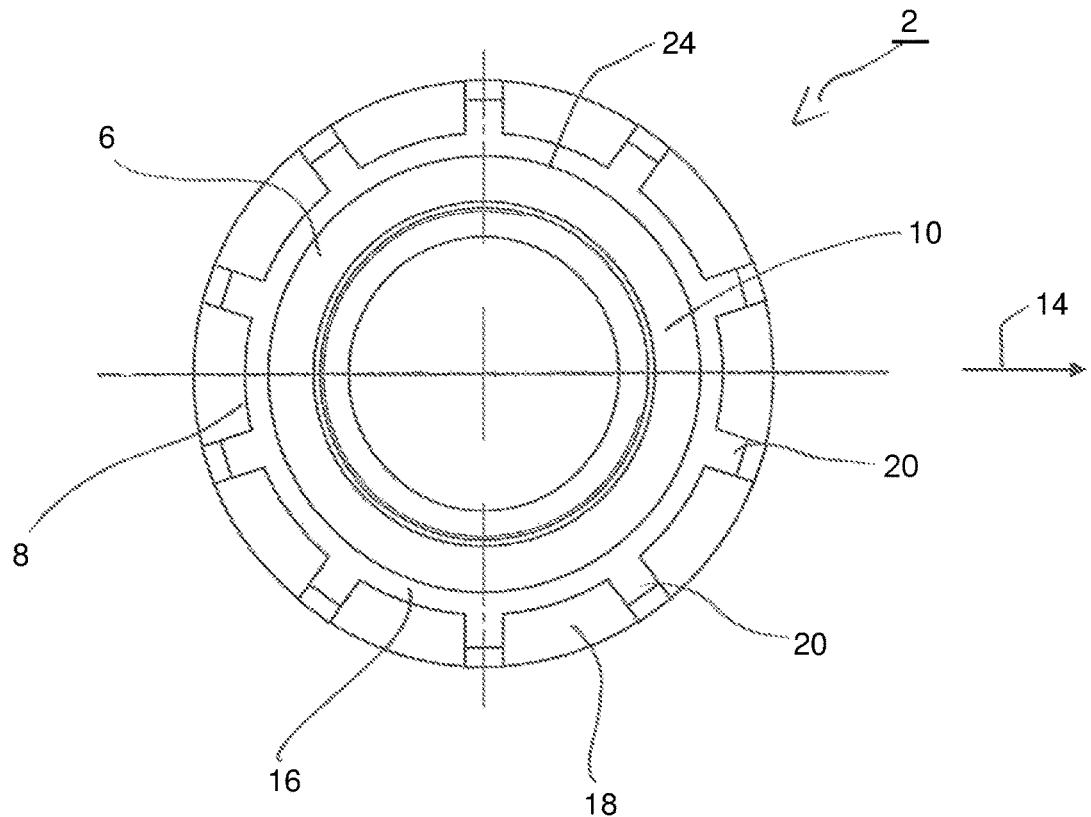
FIG. 2 is a plan view from below of the punching nut according to FIG. 1.

Referring now to the figures of the drawings in detail and first, particularly to FIGS. 1 and 2 thereof, there is shown a self-punching press-fit element that is configured as a punching nut 2. The press-fit element 2 extends in a longitudinal direction 4 and has a head part 6 which, when viewed in the longitudinal direction 4, on the lower side thereof has a head bearing 8 which is typically configured so as to be annular.

A punching collar 10 adjoins the head part 6 and the head bearing 8 in the longitudinal direction 4. The punching collar 10 has an external shell face 12 which is inclined at an angle α of, for example, 10° to 30° in relation to the longitudinal direction 4. The external shell face 12 is preferably configured as a smooth conical shell face. The entire punching collar 10 is preferably configured at the angle α so as to widen in a conical manner.

The head bearing 8 in a radial direction 14 can be subdivided into two part-regions, specifically an internal region which is formed by an encircling annular displacement web 16, as well as a radially external region 18. The displacement web 16 herein directly adjoins the punching collar 10 and in the radial direction 14 extends across a radial width b1.

The external region 18 in relation to the displacement web 16 is set back counter to the longitudinal direction 4. The external region 18 in the radial direction 14 extends across a radial width b2.

The displacement web 16 herein transitions into the external region 18, preferably configuring a step. Therefore, the displacement web 16 on the radially outermost region thereof in particular has an edge. The end face (annular face) that is oriented in the direction toward the punching collar 10 herein is preferably configured as a planar horizontal face perpendicular to the longitudinal direction 4. The circumferential face of the displacement web 16 is furthermore preferably configured as a vertical face, in particular a cylindrical shell face, that extends so as to be parallel to the longitudinal direction 4. The circumferential face is also preferably configured so as to be planar, without elevations or depressions.

As can be derived in particular from the plan view of FIG. 2, a plurality of ribs 20 which configure an anti-rotation safeguard are configured so as to be uniformly distributed around the circumference on the external region 18. A total of ten ribs 20 are disposed in the exemplary embodiment. The ribs 20 preferably extend exactly in the radial direction 14.

As can be seen again in the sectional illustration of FIG. 1, the ribs 20 in the longitudinal direction 4 have a height which preferably corresponds to an axial length a1 of the displacement web 16. The ribs 20 therefore are aligned in particular with the displacement web 16, that is to say that no offset is configured in the radial direction in the transition region between the displacement web 16 and the ribs 20. The radial end of the ribs 20 in the exemplary embodiment is somewhat spaced apart from the external periphery of the head bearing 8. As can furthermore be seen from the cross-sectional illustration of FIG. 1, the radial width b1 of the displacement web 16 is smaller than the radial width b2 of the external region 18 and is in particular approximately ⅓ of the radial width b2 of the external region.

The entire head part 6, and thus also the head bearing 8, has a diameter d1 which is preferably merely approximately 35% larger than a diameter d2 of the punching collar 10.

The punching collar 10 in the longitudinal direction 4 extends across an axial length a2 which is preferably significantly longer than the axial length a1 of the displacement web. The axial length of the punching collar 10 plus the axial length a1 of the displacement web herein is preferably smaller than or equal to a sheet metal thickness D of a component 22 into which the punching nut 2 is to be press-fitted (cf. in this regard FIG. 3, for example).

The punching nut 2 furthermore has an internal thread 25 which preferably extends merely up to the axial height of the displacement web 16 and thus merely up to the start of the punching collar 10.

The punching collar 10 on the end side has an encircling cutting edge 24. An undercut 26 is configured between the cutting edge 24 and the displacement web 16 by virtue of the obliquely inclined external shell face 12 (cf. FIG. 1).

The displacement volume that is defined by the displacement web 16, hereunder referred to as the first volume, is of particular relevance for the targeted complete filling of the undercut with material. The first volume is defined by the annular displacement web 16 having the substantially rectangular cross-sectional face having the edge lengths b1 (radial width) and a1 (axial length). The first volume herein is significantly larger than a second volume of the undercut 26. The second volume is defined by the ring having a triangular cross-sectional face which is defined by the obliquely oriented external shell face of the punching collar 10 as well as by a protrusion of the cutting edge 24 in the radial direction 14, the protrusion being defined by the angle α. The first volume herein has at least 2 times, preferably at least 3 times, and especially 2 to 5 times or 3 to 4 times the volume of the second volume.

This requirement preferably also applies to the (first) volume of the part-region of the displacement web 16 that projects in the radial direction.

It is furthermore of further substantial relevance to the filling that the backfilling is additionally supported by the ribs 20 which directly adjoin the displacement web 16. The third volume of the ribs 20 is preferably smaller than the first volume and is, for example, 30% to 90% of the first volume.

Figure 3:
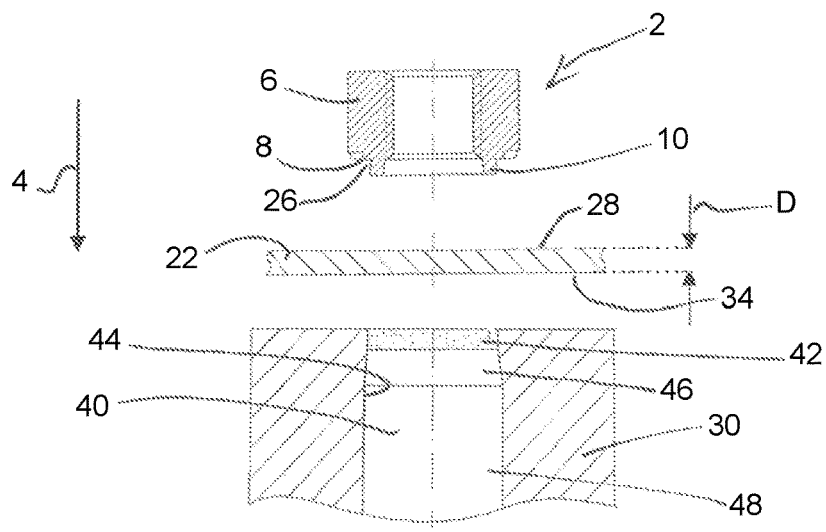
Figure 4:
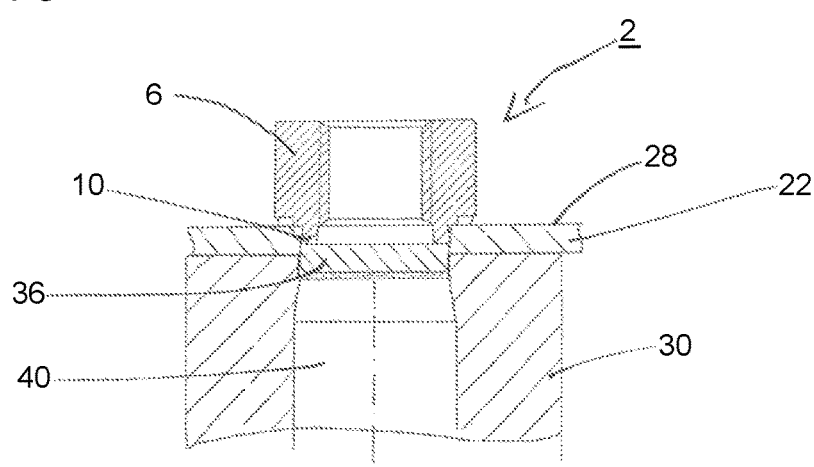

The placing procedure of the punching nut 2 will be explained in more detail hereunder with reference to FIGS. 3 to 5.

The punching nut 2 with the aid of a suitable press-fitting tool 4 (not illustrated) is pressed in the longitudinal direction 4 against an upper side 28 of the component 22, while exerting a press-fitting force. The component 22 herein is supported on a die 30 which has a die upper side 32 against which a lower side 34 of the component 22 comes to bear. The die upper side 32 herein is configured as a planar face which does not have an encircling annular or deformation collar for deforming the lower side 34.

In the altogether single-step joining process, a punching procedure in which an item of punching scrap 36 is punched from the component 22 with the aid of the punching collar 10 so as to generate a hole 38 is first performed. The item of punching scrap is press-fitted in a downward manner into a clearance 40 of the die 30. The clearance 40 herein is configured in the manner of a central bore in the die 30. The clearance continues in a downward manner such that the item of punching scrap 36 can be removed from the die 30.

The press-fitting procedure in which the axial extraction safeguard and the anti-rotation safeguard are configured is performed at the same time as the punching procedure. It is of particular relevance herein that a deformation of merely the upper side 28 of the component is performed, and the displacement web 16 from above displaces material from the upper side 28 of the component 22 and presses the material in a quasi-downward manner in the longitudinal direction into the undercut 26. Material from the upper side 28 is molded herein into the undercut 26 as can be seen in particular with reference to the cross-sectional illustration of FIG. 6. A form-fitting extraction safeguard that is effective in the axial direction results on account thereof. A jamming effect in the radial direction 14 also takes place at the same time such that a force fit is achieved.

The ribs 20 are simultaneously press-fitted from the upper side likewise into the upper side 28 of the component and displace material. The undercut 26 herein is completely filled.

Figure 5:
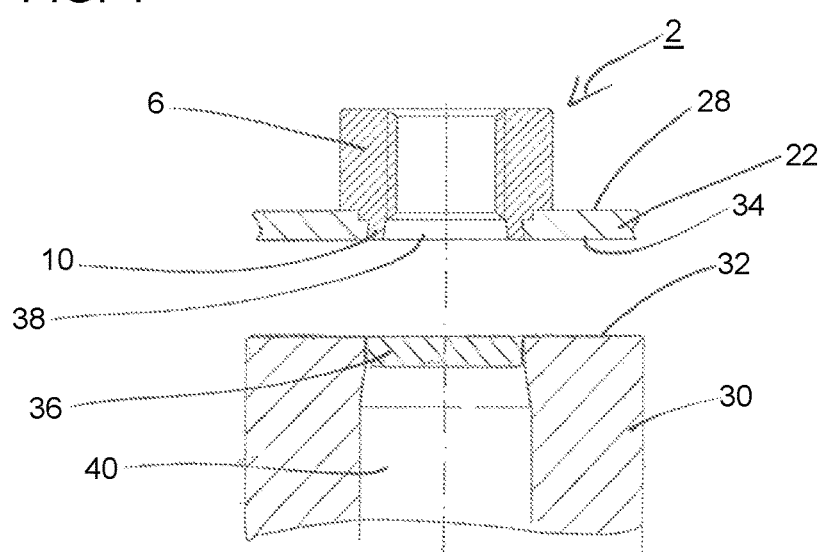
Figure 6:
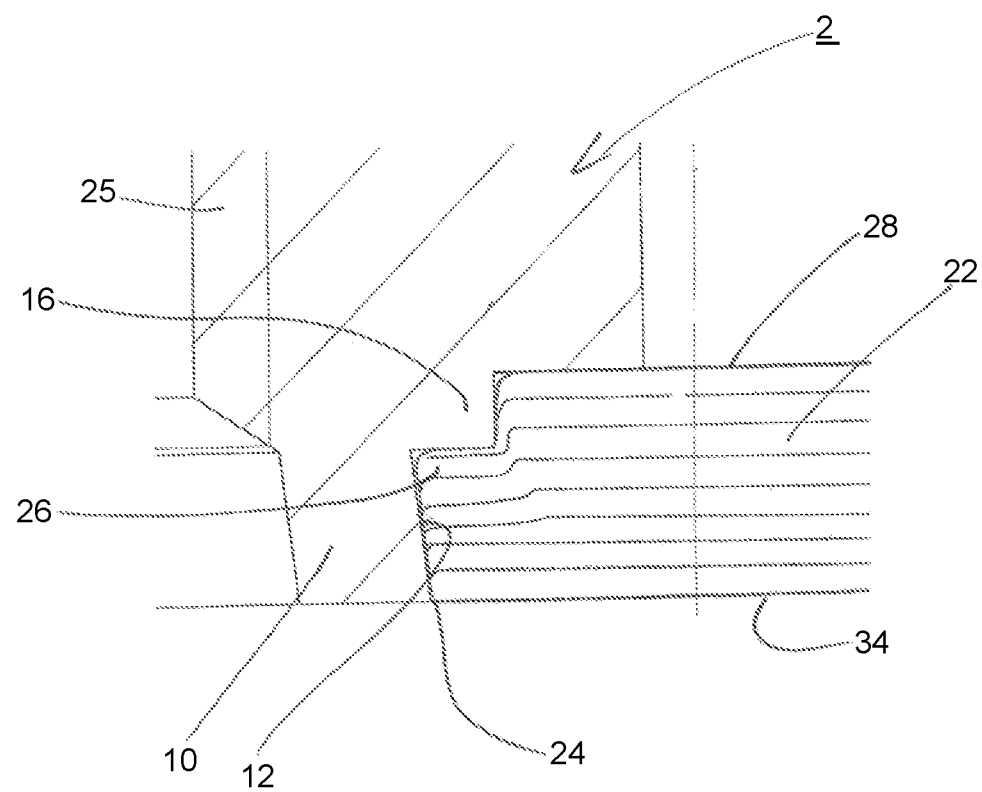
FIG. 6 is a sectional view of the press-fit connection enlarged in a detail.

The completed press-fit connection can be seen in particular with reference to FIG. 5 as well as FIG. 6. It is of particular relevance herein that a planar face is configured overall on the lower side 34 and the component 22 is specifically not deformed on the lower side 34. The planar die upper side 32 is essential to this end. The punching collar 10 in the exemplary embodiment terminates so as to be flush with the lower side 34.

With a view to a joining procedure that is reliable in terms of process also for a multiplicity of successive press-fitting operations, the die 30 furthermore has a special design embodiment of the clearance 40 thereof. As can be seen in particular with reference to FIG. 3, the clearance 40 has a preferably cylindrical region 42 on which an internal shell face 44 of the clearance is roughened, for example by way of an erosion process. A region 46 that preferably widens in a conical manner then adjoins this cylindrical region 42, the internal shell face 44 in said region 46 being preferably configured so as to be smooth. A preferably cylindrical region 48 in turn adjoins further on, the region 48, in comparison to the cylindrical region 42 having the roughened internal shell face 44, having an enlarged diameter for a discharge of the item of punching scrap 36 that is frictionless to the greatest possible extent.

The punching nut 2 described here as well as the press-fit connection with the component 22 configured by way of said punching nut 2 are preferably used in the case of light-construction materials, in particular in the case of aluminum sheets. The punching nut 2 herein is preferably used in the automotive sector. The component 22 is, for example, a door element of a motor vehicle into which a multiplicity of punching nuts 2 of this type are inserted. Further functional elements are fastened by way of the punching nuts 2. In the case of a door module, for example loudspeakers, power window motors, (plastics material) visors, sunshades, etc. are preferably fastened to punching nuts 2 of this type.

The punching nuts 2 overall are tightly press-fitted such that no rattling noises can arise even when the punching nuts 2 are not occupied by a screw.

The punching nuts 2 are press-fitted, for example, in aluminum sheets having a sheet thickness in the range of approximately 1 mm. An Al—Mg alloy, for example AlMg4, 5Mn, is used for example for the aluminum sheets.

In general, punching nuts 2 of this type are press-fitted using a punching force of several (tens of) kN, for example using approximately 20 kN, especially in the case of nuts of the size M5 and in the abovementioned aluminum sheet having a sheet thickness of 1.2 mm.

The following is a summary list of reference numerals and the corresponding structure used in the above description of the invention:

2 Punching nut
4 Longitudinal direction
6 Head part
8 Head bearing
10 Punching collar
12 External shell face
14 Radial direction
16 Displacement web
18 External region 20 Rib
22 Component
24 Cutting edge
25 Internal thread
26 Undercut
28 Upper side
30 Die
32 Die upper side
34 Lower side
36 Item of punching scrap
38 Hole
40 Clearance
42 Cylindrical region
44 Internal shell face
46 Conical region
48 Cylindrical region
α Angle
b1 Radial width of displacement web
b2 Radial width of external region
a1 Axial length of displacement web
a2 Axial length of punching collar
d1 Diameter of head bearing
d2 Diameter of punching collar
D Sheet thickness

The invention claimed is:

1. A self-punching press-fit element for press-fitting into a component, comprising:
   a head part having a head bearing for bearing on the component and extending in a longitudinal direction, said head bearing having an encircling displacement web being adjoined in a radial direction by a radially external region of said head bearing, said radially external region in the longitudinal direction being set back in relation to said displacement web, said displacement web transitioning into said radially external region configuring a step;
   a punching collar having an end-side cutting edge, said punching collar configured so as to widen in a conical manner and having an external shell face that in relation to the longitudinal direction is obliquely inclined in an outward manner such that an undercut is configured between said cutting edge and said head bearing; and
   a plurality of ribs for configuring an anti-rotation safeguard are configured so as to be distributed across a circumference in said radially external region.

2. The self-punching press-fit element according to claim 1, wherein said ribs are aligned with said displacement web.

3. The self-punching press-fit element according to claim 1, wherein said displacement web has an encircling shell side and said punching collar has an encircling shell face, said encircling shell side and said encircling shell face are configured so as to be smooth without any form-fitting elements that act in a circumferential direction.

4. The self-punching press-fit element according to claim 1, wherein said radially external region does not have an external encircling annular web.

5. The self-punching press-fit element according to claim 1, wherein said displacement web in the radial direction projects beyond said cutting edge.

6. The self-punching press-fit element according to claim 1, wherein said displacement web defines a first volume, and said undercut defines a second volume, wherein the first volume is larger than the second volume.

7. The self-punching press-fit element according to claim 6, wherein the first volume is larger than the second volume by a factor from 2 to 5.

8. The self-punching press-fit element according to claim 6, wherein all of said ribs in total define a third volume which is smaller than the first volume of said displacement web and is merely 30% to 90% of the first volume.

9. The self-punching press-fit element according to claim 1, wherein said displacement web has a radial width which is smaller than or equal to a radial width of said radially external region.

10. The self-punching press-fit element according to claim 1, wherein said displacement web has an axial length which is smaller than an axial length of said punching collar and is in a range from 30% to 70% of the axial length of said punching collar.

11. The self-punching press-fit element according to claim 1, wherein the self-punching press-fit element is configured as a punching nut having an internal thread which extends only up to an axial height of said displacement web, and in that no internal thread is configured on said punching collar.

12. The self-punching press-fit element according to claim 1, wherein said head bearing has a diameter that is 20% to 40% larger than a diameter of said punching collar.

13. The self-punching press-fit element according to claim 1, wherein:
   said displacement web has an encircling shell side and said punching collar has an encircling shell face, said encircling shell side and said encircling shell face are configured so as to be smooth without any form-fitting elements that act in a circumferential direction;
   said radially external region does not have an external encircling annular web;
   said ribs are aligned with said displacement web;
   said displacement web in the radial direction projects beyond said cutting edge;
   said displacement web defines a first volume, and said undercut defines a second volume, wherein the first volume is larger than the second volume by a factor from 2 to 5; and
   the self-punching press-fit element is configured as a punching nut having an internal thread which extends only up to an axial height of said displacement web, and in that no internal thread is configured on said punching collar.

14. A press-fit connection, comprising:
   a component having an upper side and a lower side;
   a self-punching press-fit element for press-fitting into said component, said self-punching press-fit element containing:
      a head part having a head bearing for bearing on said component and extending in a longitudinal direction, said head bearing having an encircling displacement web being adjoined in a radial direction by a radially external region of said head bearing, said radially external region in the longitudinal direction being set back in relation to said displacement web, said displacement web transitioning into said radially external region configuring a step;
      a punching collar having an end-side cutting edge, said punching collar configured so as to widen in a conical manner and having an external shell face that in relation to the longitudinal direction is obliquely inclined in an outward manner such that an undercut is configured between said cutting edge and said head bearing;
      a plurality of ribs for configuring an anti-rotation safeguard being configured so as to be distributed across a circumference in said radially external region; and said displacement web being press-fitted into said upper side of said component, and a displaced material of said component is displaced by said displacement web into said undercut.

15. The press-fit connection according to claim 14, wherein said component encircles said punching collar but not upward in a direction toward said head part.

16. The press-fit connection according to claim 14, wherein:
said punching collar does not project beyond said lower side of said component;
said displacement web in the radial direction projects beyond said punching collar, and a projecting part-region defines a first volume, and said undercut defines a second volume, wherein the first volume is at least two times larger than the second volume;
said undercut is completely filled with the displaced material such that a force fit of said self-punching press-fit element in said component is already achieved on account thereof; and
said plurality of ribs for further anti-rotation safeguard are disposed so as to be distributed around the circumference of said self-punching press-fit element, said plurality of ribs adjoining said displacement web in the radial direction and being press-fitted into said upper side.

17. The press-fit connection according to claim 14, wherein said component is composed of a metal.

18. The self-punching press-fit element according to claim 14, wherein said displacement web has an encircling shell side and said punching collar has an encircling shell face, said encircling shell side and said encircling shell face are configured so as to be smooth without any form-fitting elements that act in a circumferential direction, said encircling displacement web is configured to displace sheet material into said undercut to achieve a jamming and a press fit, the jamming secures the press-fit element against rotation by way of friction of the displacement web that acts in the circumferential direction and by friction between the press-fitted material and said external shell face of said punching collar.

* * * * *